(No Model.) 2 Sheets—Sheet 1.
J. W. ATKINSON & B. PHELPS.
CORNSTALK CUTTER.
No. 298,655. Patented May 13, 1884.
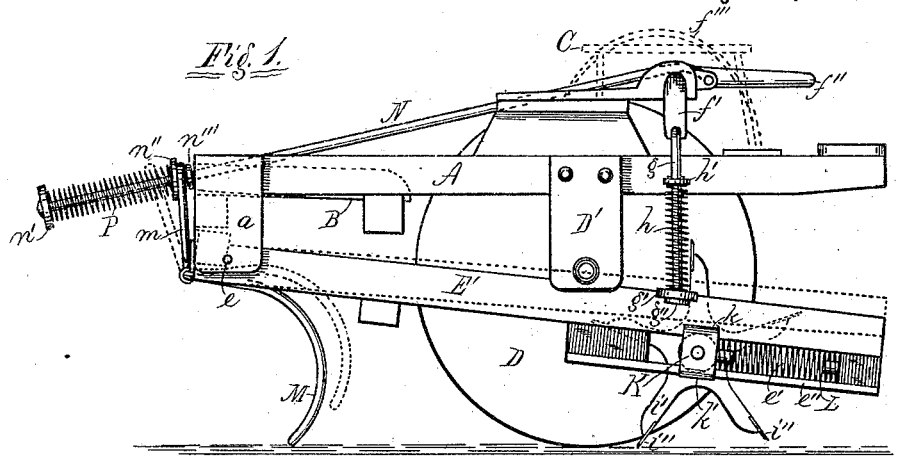
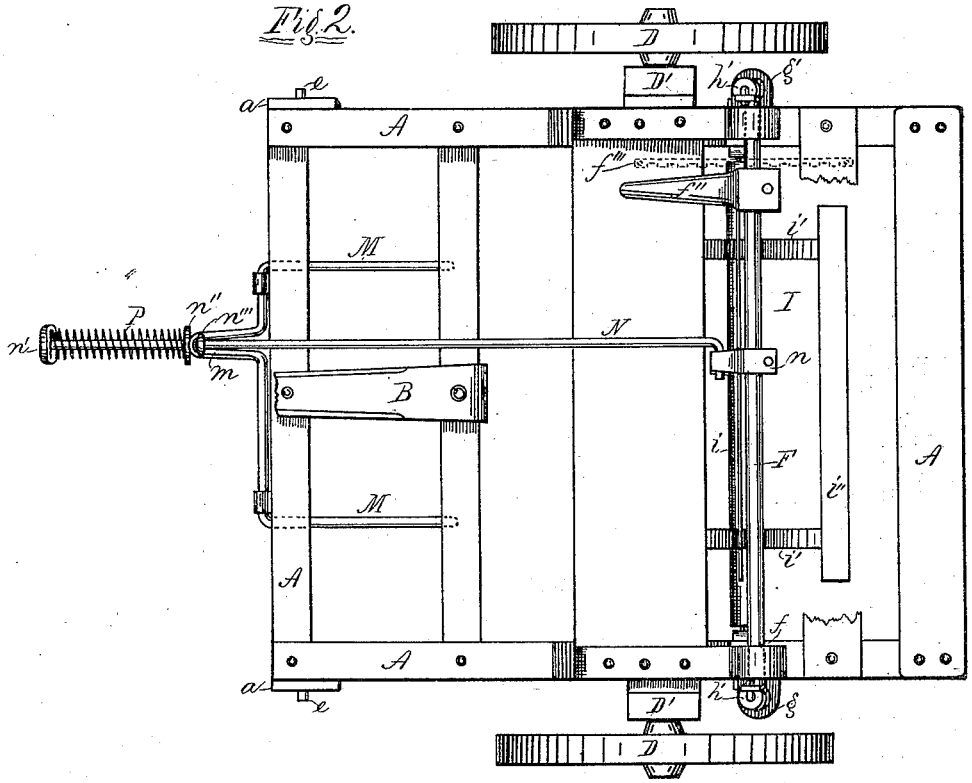
Witnesses:
D. R. Richards.
Wm. M. Thompson.
Inventors:
James W. Atkinson,
Byron Phelps,
By W. R. Richards, Atty.

(No Model.) 2 Sheets—Sheet 2.

J. W. ATKINSON & B. PHELPS.
CORNSTALK CUTTER.

No. 298,655. Patented May 13, 1884.

Witnesses:
P. R. Richards.
Wm. M. Thompson.

Inventors:
James W. Atkinson,
Byron Phelps,
By W. R. Richards, Atty.

UNITED STATES PATENT OFFICE.

JAMES W. ATKINSON AND BYRON PHELPS, OF MOLINE, ILLINOIS, ASSIGNORS TO DEERE & MANSUR COMPANY, OF SAME PLACE.

CORNSTALK-CUTTER.

SPECIFICATION forming part of Letters Patent No. 298,655, dated May 13, 1884.

Application filed January 12, 1883. (No model.)

*To all whom it may concern:*

Be it known that we, JAMES W. ATKINSON and BYRON PHELPS, citizens of the United States, residing at Moline, in the county of Rock Island and State of Illinois, have invented certain new and useful Improvements in Cornstalk-Cutters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

A principal object in our invention is to increase the force of the blow delivered by the chopping-knives, whereby a light cylinder of cutters of correspondingly easy draft may be made to cut as effectively as a heavier cylinder; and to this end our invention consists in a spring or springs intervened between the shaft of the cutter-cylinder and the frame, in which it is journaled in such manner that it (the spring) will be compressed from the moment each cutter-blade strikes the ground or stalks until the center of gravity of the cutter-cylinder is immediately over said cutter-blade, when the resiliency of the spring will act to throw the cutter-cylinder shaft forward, and thereby increase the force of descent of the cutter-blade next approaching the ground.

The invention further consists in constructions and combinations hereinafter described, and relating to that class of stalk-cutters in which the cylinder of cutters is journaled in a swinging frame which is hinged to a wheel-frame, and, further, in which springs are intervened between the lifting-lever and the swinging cutter-carrying frame, and in which the same movement of the lifting-lever which raises the cylinder of cutters from the ground at the same time raises the stalk-aligning hooks.

Figure 6:
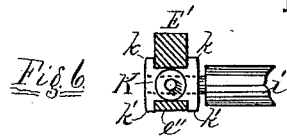
Figure 5:
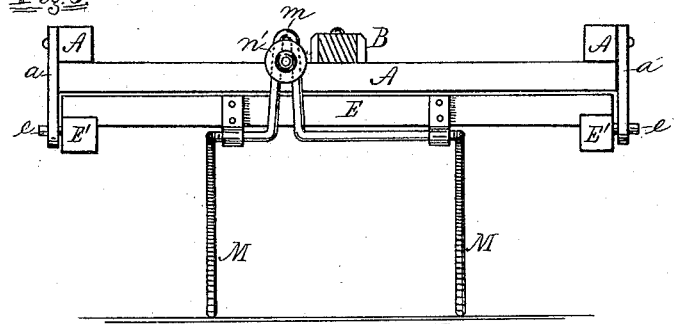
Figure 4:
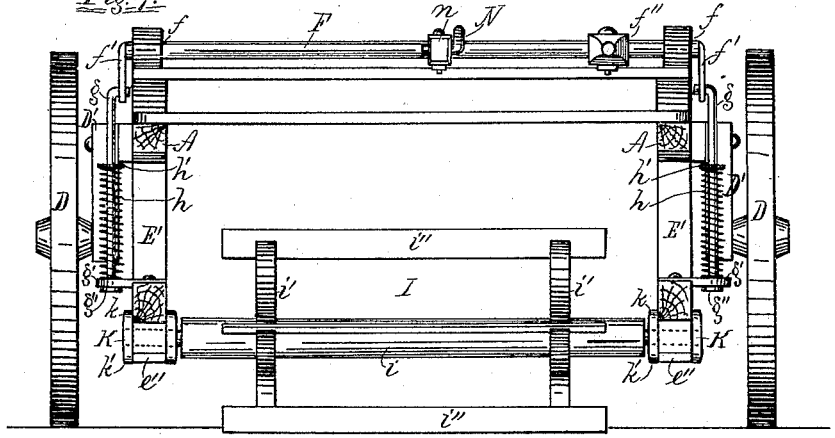
Figure 3:
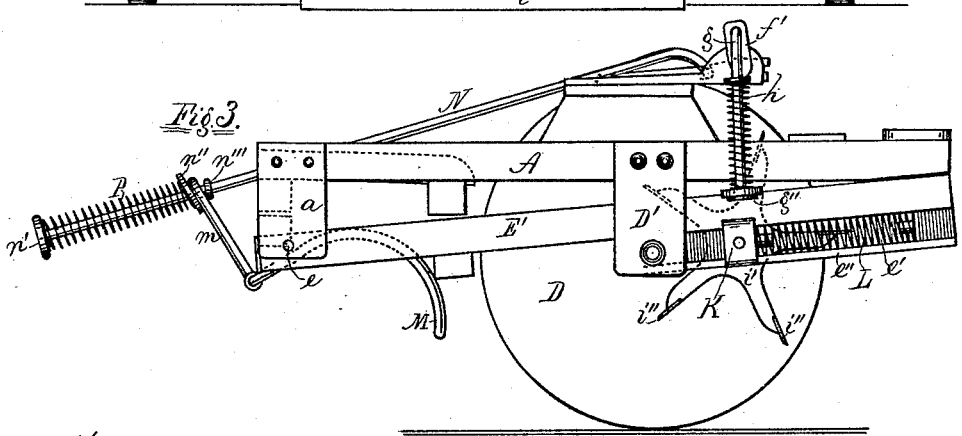

In the accompanying drawings, which illustrate a stalk-cutter embodying our invention, Figure 1 is a side elevation; Fig. 2, a top plan; Fig. 3, a side elevation; Fig. 4, a rear elevation; Fig. 5, a partial front elevation; Fig. 6, a detail hereinafter referred to.

Referring to the drawings by letters, the same letter indicating the same part in the different figures, A represents a frame provided with draft-pole B and a seat, C, and is carried on wheels D, journaled on pendants D'. The seat C is only shown by dotted lines at Fig. 1, and may be located as shown, or in any desirable manner.

E is a frame, having side bars, E', located below the frame A, and hinged at $e$ to pendants $a$ from frame A, so that its rear end may swing in a vertical plane.

F is a shaft extending laterally across frame A, and is journaled in bearings $f$ thereon. The shaft F has a crank, $f'$, on each end, from which a rod, $g$, extends downward and passes loosely through a lug, $g'$, on the side of the frame E. A head, $g''$, on each rod $g$, immediately below its respective lug $g'$, allows the lug $g'$ to slide up and down on the rod $g$, and comes against the lug and lifts the swinging frame E, as shown at Fig. 3, when the cranks $f'$ are turned upward by means of the lever $f'''$, which projects from the shaft F. A spring, $h$, encircles each rod $g$ between the lug $g'$ and a stop, $h'$, attached to the rod $g$, which presses downward on the swinging frame with a yielding force when the machine is in operation, and the lever $f''$ is turned rearward and held as adjusted in the ordinary manner by the rack-bar $f''''$.

I is a cylinder of cutters, formed of shaft $i$, heads $i'$, and blades $i''$, parallel with the axis of the shaft $i$.

The parts hereinbefore described by reference-letters are parts of an ordinary stalk-cutter.

Each side bar, E', of the frame E has a horizontal longitudinal slot, $e'$, through its rear portion; or it may be formed by securing a bar, $e''$, beneath the bar E', as shown. A block, K, is placed in each slot $e'$, and is held from displacement laterally therein, while permitted to slide back and forth lengthwise of the slot by means of upper and lower side flanges, $k\ k'$. A spiral spring, L, is located in each slot $e'$, in rear of the block K, with one end of the spiral resting against the block K and its other end against the wall at the rear end of the slot. The shaft $i$ is journaled at its ends in the blocks K.

M M are the drag-hooks for drawing the stalks into proper position for cutting. The hooks M are formed of a single bar bent upwardly at its mid-length portion to form a stirrup, $m$, through which a rod, N, passes, the rear end of which is connected with an arm, $n$, on the shaft F, and the forward end of which has a head, $n'$. A spiral spring, P, encircles the rod N between the head $n'$ and a sliding collar, $n''$, on the rod N, forward of the stirrup $m$.

$n'''$ is a fixed collar on the rod N, in rear of the stirrup $m$.

In operation the hooks M may rise independently of the rod N, as shown by dotted lines at Fig. 1, by the sliding collar $n''$ moving forward, and said hooks are thus held to the ground by the spring P with a yielding force, which may be adjusted in amount by adjusting the head $n'$ on the rod N and fixing it after adjustment by a set-screw, which may be attached in any suitable manner. When the lever $f'''$ is turned forward to raise the frame E and the cylinder of cutters above the ground, the rod N will be moved forward by the arm $n$, and the collar $n'''$ will force the stirrup $m$ forward, and thereby raise the hooks M at the same time the cylinder of cutters is raised above the ground, as shown at Fig. 3.

When the machine is moving forward in operation and a cutter-blade strikes the ground, as shown in Fig. 1, an increased force is then required to advance the machine until the shaft $i$ is over the cutter-blade which is in contact with the ground. This increased force required arises from the increased resistance of the cylinder of cutters, and the same increased resistance of said cylinder will force the blocks K rearward, and thereby compress the springs L, as shown at same figure, until the shaft $i$ has advanced to the position described over the cutter-blade, when the compressed springs will then act by their resiliency to force the blocks K forward in the slots $e'$, which will hasten the movement of the next succeeding cutter-blade toward the ground, and thereby increase its chopping force in such manner that a lighter cylinder of cutters may be made to cut as effectively as a heavier one would do without the sliding bearings for the cutter-cylinder shaft. As the increased resistance of the cylinder of cutters occurs, as hereinbefore described, the frame E will be slightly raised, and thereby compress the springs $h$, and as such resistance is removed these springs $h$ will coact with the springs L to still further increase the force of cut of the blades.

We are aware that springs have been used in various ways for increasing the cutting action of stalk-cutters, and in some cases the stalk-cutters have been provided with a spring located between the wheel-frame and the swinging frame in such manner that the swinging frame is drawn by the spring, and in which the swinging frame must be moved forward relatively to the wheel-frame in order to increase the cutting action of the blades; and we desire to distinctly state that while we do not claim such invention, broadly, we do not either limit our claim to a spring arranged exactly as we have shown, as it will be readily seen that the spring may be arranged in various ways to act upon a cylinder of cutters adapted to slide backward and forward in the frame which carries it.

What we claim as new, and desire to secure by Letters Patent, is—

1. In a stalk-cutter, in combination with a frame, E, adapted to be dragged by one end, and a cylinder of cutters journaled in said frame and adapted to slide back and forth with reference to said frame, springs adapted to operate substantially as and for the purpose specified.

2. In a stalk-cutter, in combination with the wheel-frame and a swinging frame hinged thereto, a cylinder of cutters journaled to the swinging frame in bearings which permit it to slide back and forth in said swinging frame, substantially as and for the purpose specified.

3. In a stalk-cutter, in combination with the wheel-frame, a swinging frame hinged thereto, and a cylinder of cutters journaled to the swinging frame in bearings which permit it to slide back and forth with reference to said swinging frame, springs adapted to act on the cylinder of cutters, substantially as and for the purpose specified.

4. In combination with the frame E, having slots $e'$, the cylinder of cutters I, journaled in blocks K, which slide back and forth in the slots $e'$, and the springs L, located in the slots $e'$, and adapted to act on the cylinder of cutters, substantially as and for the purpose specified.

5. In combination with the frame A and the swinging frame E, hinged thereto, and having slots $e'$, the cylinder of cutters I, journaled in blocks K, which slide back and forth in the slots $e'$, and the springs L, located in the slots $e'$ in rear of the blocks K, and adapted to act on the cylinder of cutters, substantially as and for the purpose specified.

6. In combination with the frame A, swinging frame E, having slots $e'$, cylinder of cutters journaled in blocks which slide in the slots $e'$, and springs L, the crank-shaft F, connected with the frame E by a rod, $g$, and spring $h$, substantially as and for the purpose specified.

7. In a stalk-cutter, in combination with the frame, rod N, and drag-hooks hinged to the frame, the spring P, adapted to hold the drag-hooks in contact with the ground with a yielding force, substantially as and for the purpose specified.

8. In a stalk-cutter, in combination with the frame and drag-hooks hinged thereto, and rod N, adapted to raise the drags off the ground, a spring, P, adapted to hold the drag-hooks in contact with the ground and to yield to permit said hooks to rise independently of the rod N, substantially as and for the purpose specified.

9. In combination with the wheel-frame and swinging frame, shaft F, and rods $g$ and N, adapted to raise the swinging frame and drag-hooks simultaneously, the spring P, adapted to operate substantially as and for the purpose specified.

In testimony whereof we affix our signatures in presence of two witnesses.

JAMES W. ATKINSON.
BYRON PHELPS.

Witnesses:
J. T. BROWNING,
W. J. ENTRIKIN.